3,451,980
ANAEROBIC ADHESIVE
Arthur M. Brownstein, Morristown, N.J., assignor to Princeton Chemical Research, Inc., Princeton, N.J., a corporation
No Drawing. Filed Aug. 24, 1966, Ser. No. 574,803
Int. Cl. C09j 3/14, 5/10
U.S. Cl. 260—78.5                          22 Claims This invention relates to anaerobic adhesive compositions. It more particularly refers to anaerobic adhesive which has residual binding power.

Anaerobic curing characteristics may be defined as the property of a polymerizable compound to polymerize rapidly and spontaneously to the solid state upon the exclusion of air or oxygen from the compound while exhibiting a long shelf life in the liquid state as long as contact with air is maintained. This property is particularly useful in the bonding or adhering of adjacent surfaces since the composition can be stored or permitted to stand in contact with air for extended periods of time without polymerizing, yet when it is deposited or placed between adjacent surfaces the accompanying exclusion of air causes the composition to polymerize and form a strong bond.

One application of anaerobic adhesives is in the locknut art. That is, such adhesives are suitably applied to bolt or nut threads and when the two are joined, the adhesive in the thread grooves between the nut and bolt is deprived of atmospheric oxygen and tends to adhere the nut and bolt together thus "locking" the nut in place and making it less likely to come loose, particularly when the nut and bolt are subjected to vibration as is often the case where such nuts and bolts are used to fasten moving machinery.

It is known in the art to produce anaerobic adhesives from aliphatic methacrylic acid esters, particularly diesters of methacrylic acid and dihydric alcohols. It is also known that nuts and bolts joined together by many of the known anaerobic adhesives can be loosened even after the adhesive sets up by the simple expedient of applying sufficient torquent to the nut and bolt to break the adhesive bond. It has been considered desirable to provide an anaerobic adhesive which possessed adhesive binding action after the initial bond has been broken. This is desirable because it is often necessary to temporarily loosen bolt and nut combinations and thereafter to retighten them. Thus, the existing anaerobic adhesives fall somewhat short with respect to this important physical property. It has only been necessary to supply sufficient torque to turn the nut for about one-half revolution in order to shatter the adhesive bond, whereas an additional full turn of the nut reduced the required nut loosening torque to about zero with the exception of the frictional forces exerted by the residue of the shattered adhesive. It has been discovered that certain anaerobic adhesives could be internally plasticized in order to impart to them the ability to retain some adhesive binding action, even after the initial bond has been broken through applied torque. In co-pending U.S. application, Ser. No. 541,429, filed Mar. 9, 1966, and assigned to the same assignee as the instant application, an anaerobic adhesive composition comprising an internal plasticizer and a mixture of saturated and unsaturated diesters of pyromellitic acid, has been disclosed. This adhesive material has all of the desired anaerobic adhesive properties, in that it remains in the liquid form relatively indefinitely when exposed to oxygen and it sets up quickly to a firm adhesive bond when deprived of oxygen. This composition, in addition, has the ability to retain some adhesive strength even after the main bond strength has been destroyed, for example, by applying torque as described above.

While this previously described composition has this very desirable property of residual adhesive bond sterngth, it is most desirable to provide anaerobic adhesive compositions which have this property to a greater extent and thus are more valuable.

It is therefore an object of this invention to provide a novel anaerobic adhesive composition.

It is another object of this invention to provide a novel anaerobic adhesive composition which has greater residual adhesive bond strength than has heretofore been available.

Other and additional objects of this invention will become apparent from a consideration of this entire specification including the claims appended hereto.

In accord with and fulfilling these objects, one aspect of this invention includes a composition comprising a diester of an aromatic tetracarboxylic acid, wherein the alcoholic moiety of the ester linkage contains olefinic unsaturation in conjugation with a carbonyl group; and a mono-ester of a polycarboxylic acid containing no non-benzenoid unsaturation, wherein the alcoholic moiety of the ester linkage contains olefinic unsaturation in conjugation with a carbonyl group.

The aromatic tetracarboxylic acid according to this invention, suitably has one or more than one aromatic ring and the carboxylic acid groups thereof may be distributed in any fashion amongst the rings. Thus, the simplest case is a tetracarboxyl benzene. The aromatic ring may suitably contain one or two additional substituents such as, for example, alkyl groups containing up to about six carbon atoms in straight or branched chain configuration. These non-carboxylic acid substituents may be the same or different as the case may be. The carboxylic acid substituents on the benzene ring may or may not be symmetrically disposed about the ring. The two esterified carboxyl groups may be in any of the ortho, meta or para position to each other.

In a similar manner, this invention includes tetracarboxyl naphthalenes and anthracenes, wherein the carboxyl groups may have any distribution on the fused phenyl rings but are preferably distributed in pairs, with two groups on each ring of a naphthyl nucleus for example. As in the case of a mono-nuclear tetracarboxylic acid, the carboxyl groups may be in any relative positions to each other and there may be additional non-functionally substituted substituents on the aromatic rings. The maximum number of these non-functional substituents is equal to the number of available substituent positions open on the aromatic rings after taking into account the four positions occupied by the required carboxyl groups. It is preferred that these non-functional substituents are lower alkyl groups containing up to about six carbon atoms in straight or branched chain configuration.

It is also within the scope of this invention to utilize tetracarboxylic acid aromatic compounds having more than one aromatic ring, where the rings are not fused. Illustrative of the types of aromatic moieties, intended within the meaning of this portion of this invention, are biphenyls, bisphenyl ethers, bisphenyl thioethers, bisphenyl sulphides, bisphenyl sulphones, benzophenones, polyphenyl silanes and polyphenyl substituted alkanes. In a similar manner to those aromatic compounds discussed above, the nonfused ring multicyclic aromatic moieties discussed here may contain their four carboxyl groups in substantially any arrangement desired. It is of course preferred that the carboxyl groups are distributed in such manner that where there are two aromatic rings, each contains two carboxyl groups and where there are more than two aromatic rings, each ring carries its proportionate share of the four carboxyl groups. It is of course appreciated that in the case of a moiety such as triphenyl methane or silane, it is not possible to absolutely evenly distribute the carboxyl groups. In this type of situation, it is preferred to provide reasonable distribution, e.g. in triphenyl moieties the carboxyl groups are preferably distributed 1,1,2 or 0,2,2 on the respective rings. As with other aromatic moieties, discussed above, the non-fused ring aromatic tetracarboxylic acids may have non-functional substituents thereon up to the number of available substitution sites not occupied by the carboxyl substituents.

The polycarboxylic acid containing no non-benzenoid unsaturation according to this invention, may be a mono- or polycyclic aromatic polycarboxylic acid of the type described above with reference to the aromatic tetracarboxylic acids, supra, these same aromatic moieties broader definition and includes, in addition to the tetracarboxylic acids, supra, these same aromatic moieites containing any number of carboxylic groups greater than one (1). Thus, for example, a phenyl, naphthyl, anthracyl, biphenyl or other above referred-to aromatic moiety having at least two carboxyl groups and preferably no more than about 4 carboxyl groups are suited to use in this invention. Further, the saturated moieties corresponding to these aromatic acids are also eminently well suited to use in this invention. Still further, in addition to the aromatic and alicyclic polycarboxylic acids, the acyclic polycarboxylic acids are generally useful in this invention. These moieties include polycarboxyl-substituted hydrocarbons or acyclic moieties containing hetero atoms, such as oxygen, nitrogen and/or sulfur, for example, amine polycarboxylic acids, ether polycarboxylic acids and thioether polycarboxylic acids. It is preferred in the practice of this aspect of this invention to use hydrocarbon polycarboxylic acid moieties, wherein the aromatic or alicyclic moieties if used, contain only one ring which may be alkyl-substituted as suggested above. If an acyclic aliphatic polycarboxylic acid is used, it is preferred that it contain up to about ten carbon atoms therein. In the case of alicyclic carboxylic acids, it is preferred that the ring be a cyclohexane ring. This is in no way limiting, however, since rings of about 4 to 10 carbon atoms can be conveniently used as can bicyclo materials such as octahydronaphthalene derivatives for example.

Specific compounds which are exemplary of the acid moieties intended for use in this invention (named as acids) include: pyromellitic acid; phthalic acid; terephthalic acid; naphthalene tetracarboxylic acid; anthracene tetracarboxylic acid; biphenyl tetra- and dicarboxylic acids; tri(carboxyphenyl)silane; bis(carboxyphenyl)isopropane; bis(orthodicarboxyphenyl)thioether; bis(carboxyphenyl)sulphone; tris(carboxyphenyl)methane; etc. It is of course understood that the tetracarboxy acids are useful in producing both the diester and the monoester components of the composition of this invention, whereas the di- and tricarboxylic acids are only intended for use in preparing the monoester component.

As stated above, the alcoholic moiety of both of the mono- and diesters of this invention has conjugated carbonyl and olefin groups. This alcoholic moiety generally corresponds to the structural formula:

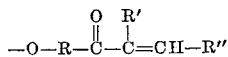

wherein both the R' and R" are hydrocarbons containing up to about six carbon atoms; and wherein R may be an alkylene, alkyleneoxy, alkyleneamino group, or one of said groups containing an oxygen or sulfurhetero atom linkage therein.

The moieties R' and R" are suitably exemplified by hydrogen, methyl, ethyl, n-butyl, etc.

The moiety R is suitably exemplified by

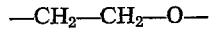

in which case the alcoholic moiety (named as an alcohol) would be a hydroxyethyl acrylate in the case where R' and R" are both hydrogen. The above-identified ethylene linkage may be propylene or isopropylene or for that matter substantially any alkylene group having up to about 16 carbon atoms in the straight chain extending between the indicated oxygen atoms.

Additionally R is suitably exemplified by

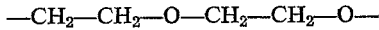

in which case the alcoholic moiety (named as an alcohol) would be diethylene glycol monoacrylate in the case where R' and R" are both hydrogen. The above-identified di(ethylene oxy) linkage may be di(propylene oxy), di(isopropylene oxy) or for that matter substantially any di(alkylene oxy) group having up to about 6 carbon atoms in the alkylene group.

It is also within the scope of this invention to provide oligomeric ethers as the R group, for example, polyethylene oxide, polypropylene oxide, higher homologous alkylene oxide oligomers or alkylene oxide oligomers having mixed alkylene group mer. units therein. It is preferred in the case of these oligomers to provide up to about 16 mer. units of appropriate alkyleneoxy groups therein.

Further, it is within the scope of this invention to substitute a sulfur or nitrogen atom for the oxygen atom in the alkylene ether oligomer so as to provide an alkylene thioether oligomer or an alkylene amine oligomer otherwise having the same definition and exemplary components as recited above. Thus, the simplest example of this type of compound would be:

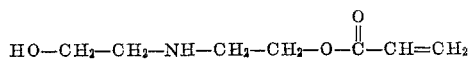

or

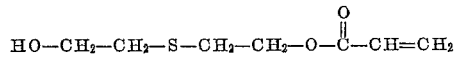

The alcoholic moieties of this invention may further be exemplified by the amide reaction products of aminoalcohols and α-β olefinically unsaturated acids, such as for example, N-hydroxyethyl acrylamide. In this regard, all of the above-defined exemplary compounds and compound constituents, are included in the definition and exemplification of this group of alcoholic moieties with the proviso that an amide linkage join the unsaturation to the remainder of the alcoholic moiety.

It is further within the scope of this invention to provide as the alcoholic moiety an unsaturated ketone in which case R in the above formula would be an alkylene group having substantially the same definition as the alkylene defined above, but without the presence of an oxygen, sulfur or nitrogen hetero atom in the chain between the carbonyl group conjugated with the olefinic unsaturation and the ester group joining the aromatic carboxylic acid.

It is preferred in the practice of this invention to incorporate into the anaerobic adhesive composition hereof, a vinyl polymerization catalyst. These materials are per se quite well known in the art. They may be exemplified by various per compounds, such as, for example, cumene hydroperoxide, benzyl hydroperoxide, t-butyl hydroperoxide, methyl ethyl ketone hydroperoxide, cyclohexanone hydroperoxide, sodium peroxide and persulfate, other metallic persulfate salts, various percarbonates and perborates, etc.

In the preferred anaerobic composition of this invention, the diester component is suitably the esterification reaction product of pyromellitic acid or anhydride and hydroxyethyl monomethacrylate or hydroxy isopropyl monomethacrylate. In the preferred anaerobic composition of this invention, the monoester component is suitably the reaction product of phthalic anhydride and hydroxyethyl methacrylate or hydroxyisopropyl methacrylate.

The mole ratio of monoester to diester in the adhesive composition may range from about 99:1 to about 1.5:1, and is preferably from about 50:1 to about 2.5:1.

The amount of vinyl polymerization catalyst may vary from about 0.1 to about 5%, and is preferably about 0.5 to about 2.5% by weight of the total ester in the adhesive composition.

The mono and diesters may be prepared separately and blended in the proper mole ratios, or the adhesive composition may be prepared in a single step by combining an acid precursor of each of the esters with the desired alcohol. In this regard, it is intended that the acid precursor may be an acid, anhydride, acid halide, lower alkyl-ester or the like, as may be convenient for preparative purposes.

For example, to prepare an adhesive composition comprised of bis-hydroxyethylmethacrylyl pyromellitate and monohydroxyethyl phthalate, pyromellitic dianhydride and phthalic anhydride are combined in the desired mole ratio and heated at 115–130° for 3 hours with a stoichiometric amount of hydroxyethyl methacrylate. If desired, an excess of alcohol can be employed which can be removed in vacuo at the end of the reaction.

The adhesive composition according to this invention, even after the addition of catalyst has almost unlimited shelf life in the presence of air, but will cure to a tenacious adhesive when exposure to air is prevented.

To set the adhesive, it is generally only necessary to confine it between the surfaces to be bonded, preferably in the presence of metal ions. Sufficient air is excluded by this action to permit the adhesive to cure.

The addition of metal ions, such as iron, zinc, cobalt or cadmium, generally serves to accelerate the curing action.

The adhesive will set over a wide range of temperatures, from 0 to 200° C., and preferably from 15 to 125° C. Curing action is more rapid at elevated temperatures.

The degree of exposure to oxygen, such as air, in order to prevent curing even at elevated temperatures need not be too extensive. The adhesive in a bottle or other container having a free surface exposed to the air in the container will not cure even when stored at elevated temperatures (e.g., 100° F.) for long periods.

The following examples are given by way of illustration of the practice of this invention without in any way being limiting thereon. In these examples, parts and percentages are by weight and temperature is in degrees centigrade.

EXAMPLE 1

Preparation of adhesive

A reactor was charged with phthalic anhydride (26.6 parts), pyromellitic dianhydride (4.36 parts) and hydroxyethyl monomethacrylate (28.6 parts). The mixture was constantly agitated and heated at 120–130° for 3 hours. At the end of this time, a neutralization equivalent of 274 was obtained in good agreement with that expected for a 10:90 mole ratio of bis-hydroxyethyl-methacrylyl pyromellitate (I) and mono-hydroxyethyl-methacrylyl phthalate (II).

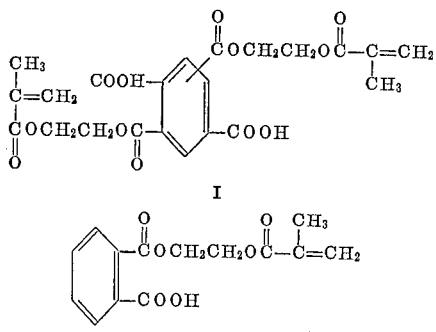

To this mixture was added α-cumene hydroperoxide (1.16 parts) to form a mixture containing 2% of the latter. Sufficient acetone was added to the syrupy product to yield a fluid of 95% solids concentration.

EXAMPLE 2

The procedure of Example 1 was repeated employing a 5:1 mole ratio of phthalic anhydride to pyromellitic dianhydride to yield a mixture containing 20 mole percent of hydroxyethylmethacrylyl pyromellitate instead of 10 mole percent in the above example. A neutralization equivalent of 270 was obtained as expected. An acetone solution of 85% solids content was prepared. Cumene hydroperoxide was again added to form 2% of the total ester content of the mixture.

EXAMPLE 3

The procedure of Example 1 was repeated employing a 10:1 mole ratio of phthalic anhydride to benzophenone tetracarboxylic acid dianhydride and the stoichiometric amount of hydroxyethyl monomethacrylate. t-Butyl hydroperoxide was employed as the vinyl polymerization catalyst.

EXAMPLE 4

The procedure of Example 1 was repeated employing a 5:1 mole ratio of phthalic anhydride to pyromellitic dianhydride, and the stoichiometric amount of hydroxy propyl monomethacrylate. α-Cumene hydroperoxide was employed as the vinyl polymerization catalyst in 1.5% concentration.

EXAMPLE 5

A variety of adhesive compositions were prepared by blending the mono ester of phthalic acid and hydroxyethyl monomethacrylate with the diester of hydroxyethylmethacrylate and pyromellitic acid. The mixtures were combined with sufficient α-cumene hydroperoxide to produce a 2% mixture of the latter. Sufficient acetone was then added to produce an 80% solids concentration.

EXAMPLE 6

Adhesive properties

The adhesive compositions prepared in Example 5 were coated onto ⅜″ iron carriage bolts. The nuts were screwed on, and the system was allowed to stand for 7 days at ambient temperatures. At the end of this time, the torque required to turn the nut about the bolt was measured per half revolution by turning the nut first 2 full revolutions in a counter-clockwise direction, then 2 full revolutions in a clockwise direction, and finally 2 full revolutions again in a counter-clockwise direction. The data are summarized in Table I, where (+) denotes a counter-clockwise direction, and (—) denotes a clockwise direction.

TABLE I

| Mole Percent Diester | Degrees of turn | | | | | | | |
|---|---|---|---|---|---|---|---|---|
| | +180 | +360 | +540 | +720 | −180 | −360 | −540 | −720 |
| | Torque, ft./lbs. | | | | | | | |
| 0.0 | 2.5 / 2.5 | 2.5 / 2.5 | 2.5 / 2.5 | 1.0 | 1.5 | 2.5 | 2.5 | 2.5 |
| 22.0 | 10.0 / 5.0 | 7.5 / 3.0 | 5.0 / 2.5 | 3.0 / 2.5 | 3.0 | 3.0 | 3.0 | 5.0 |
| 39.5 | 12.5 / 5.0 | 12.5 / 5.0 | 10.0 / 5.0 | 6.0 / 5.0 | 5.0 | 6.0 | 6.0 | 5.0 |
| 53.0 | 16.0 / 4.0 | 12.5 / 3.0 | 8.0 / 2.5 | 3.0 / 0.0 | 3.0 | 4.0 | 5.0 | 7.0 |
| 100.0 | 15.0 / 0.0 | 7.5 / 0.0 | 0.0 / 0.0 | 0.0 / 0.0 | 0.0 | 0.0 | 0.0 | 0.0 |

It is evident from the above data: (1) that in the absence of diester no substantial adhesive strength is ever attained, (2) in the absence of monoester, substantial binding is obtained which is quickly lost, and (3) a similar loss in strength results if approximately 50% or more diester is present in the composition. Good reasonable torque is otherwise maintained. In those areas of the bolt exposed to air, the adhesive remains syrupy and shows no signs of cure.

EXAMPLE 7

An adhesive composition prepared by blending bis-hydroxyethylmethacrylyl pyromellitate with mono-hydroxyethylmethacrylyl phthalate to give a 20 mole percent mixture of the former and combined with α-cumene hydroperoxide was coated onto ⅝″ Zn plated tower bolts. The nut was screwed on and the system was cured for 8 days at ambient temperature.

The results of this composition (A) and one prepared by the esterification of phthalic anhydride and pyromellitic dianhydride with hydroxyethylmethacrylate (B) to give a 20 mole percent mixture of the diester are summarized in Table II.

TABLE II

| Run | Degrees of turn | | | | | | | |
|---|---|---|---|---|---|---|---|---|
| | +180 | +360 | +540 | +720 | −180 | −360 | −540 | −720 |
| | Torque, ft./lbs. | | | | | | | |
| A | 40 / 13.0 | 25.0 / 15.0 | 20.0 / 10.0 | 20.0 / 12.0 | 15.0 | 15.0 | 15.0 | 15.0 |
| B | 40 / 25.0 | 40 / 22.5 | 40 / 22.0 | 30.0 / 15.0 | 25.0 | 27.5 | 25.0 | 27.5 |

Substantially equivalent results were obtained in both instances.

EXAMPLE 8

An adhesive composition was prepared in accordance with Example 1 and was applied to ½″ Zn plated tower bolts onto which the nut was screwed. For comparison, 3 grades of Loctite adhesive were applied to the same type of bolts. (Loctite is an anaerobic adhesive comprised of an aliphatic diester of hydroxyethylmethacrylate; product of the Loctite Corp. of Newington, Conn.)

Results are summarized in Table III. The adhesives were cured for 4 days at 25°.

TABLE III

| Adhesive | Degrees of turn | | | | | | | |
|---|---|---|---|---|---|---|---|---|
| | +180 | +360 | +540 | +720 | −180 | −360 | −540 | −720 |
| | Torque, ft./lbs. | | | | | | | |
| Loctite B | 30 / 2.5 | 7.5 / 2.0 | 5.0 / 2.0 | 2.0 / 1.5 | 2.5 | 2.5 | 3.0 | 2.5 |
| Loctite C | 17.5 / 2.0 | 5.0 / 2.5 | 2.5 / 2.5 | 2.5 / 2.5 | 1.5 | 2.0 | 2.0 | 2.5 |
| Loctite H | 5.0 / 2.5 | 2.5 / 1.5 | 2.0 / 1.5 | 2.0 / 1.5 | 2.0 | 1.5 | 1.5 | 1.5 |
| Example 1 | 40 / 22.5 | 40 / 22.5 | 40 / 20.0 | 40 / 22.5 | 35 | 28 | 28 | 22.5 |

The superiority of the adhesive of the present invention over that of the prior art is readily evident as exhibited by its far greater binding strength.

What is claimed is:

1. A composition suitable for use as an anaerobic adhesive comprising a mixture of (1) a diester of a tetracarboxylic aromatic acid, wherein the alcoholic moiety of said ester contains a carbonyl group in conjugation with an olefinic unsaturation and (2) a monoester of a polycarboxylic acid, wherein the alcoholic moiety of said ester contains a carbonyl group in conjugation with an olefinic unsaturation.

2. The composition claimed in claim 1, wherein said polycarboxylic acid contains about 2 to 4 carboxyl groups.

3. The composition claimed in claim 1, wherein said tetracarboxylic aromatic acid has about 1 to 3 aromatic rings therein.

4. The composition claimed in claim 1, wherein said acid contains fused aromatic rings therein.

5. The composition claimed in claim 1, wherein said acid contains multiple unfused aromatic rings.

6. The composition claimed in claim 1, wherein said polycarboxylic acid is an aliphatic polycarboxylic acid containing about 2 to 4 carboxyl groups and up to about 10 carbon atoms therein.

7. The composition claimed in claim 5, wherein said aromatic rings are joined together by at least one member selected from the group consisting of carbon, sulfur, oxygen and silicon.

8. The composition claimed in claim 5, wherein said acid is biphenyl tetracarboxylic acid.

9. The composition claimed in claim 1, wherein said tetracarboxylic acid is pyromellitic acid.

10. The composition claimed in claim 1, wherein said polycarboxylic acid is phthalic acid.

11. The composition claimed in claim 1, wherein said alcoholic moiety has the formula:

$$-O-R-\overset{O}{\underset{\|}{C}}-\overset{R'}{\underset{|}{C}}=CH-R''$$

wherein R′ and R″ are at least one member selected from the group consisting of aliphatic hydrocarbon and hydrogen; and wherein R is at least one member selected from the group consisting of alkylene, alkyleneoxy, alkylene amino, polyalkylene ether, polyalkylene thioether and polyalkylene amine.

12. The composition claimed in claim 11, wherein said R′ is methyl and said R″ is hydrogen.

13. The composition claimed in claim 11, wherein said alkylene has about 2 to about 16 carbon atoms therein.

14. The composition claimed in claim 11, wherein said H has up to about 16 repeating alkylene ether mer. units.

15. The composition claimed in claim 1, wherein said diester is the reaction product of pyromellitic dianhydride and at least one member selected from the group consisting of hydroxyethyl monomethacrylate and hydroxyisopropyl monomethacrylate.

16. The composition claimed in claim 1, wherein said monoester is the reaction product of phthalic anhydride and at least one member selected from the group consisting of hydroxyethyl monomethacrylate and hydroxyisopropyl monomethacrylate.

17. The composition claimed in claim 1, wherein the alcoholic moieties of both said mono- and diesters are the same.

18. The composition claimed in claim 1, containing a vinyl polymerization catalyst.

19. The composition claimed in claim 18, wherein said vinyl polymerization catalyst comprises about 0.1 to 5 weight percent of said composition.

20. The composition claimed in claim 18, wherein said vinyl polymerization catalyst comprises about 0.5 to 2.5 weight percent of said composition.

21. The composition claimed in claim 1, wherein the mole ratio of said diester to said monoester is about 1:99 to 1 to 1.5.

22. The composition claimed in claim 1, wherein the mole ratio of said diester to said monoester is about 1:50 to 1:2.5.

References Cited

UNITED STATES PATENTS

| | | |
|---|---|---|
| 3,150,118 | 9/1964 | Clemens. |
| 3,336,360 | 8/1967 | Dill. |
| 3,336,418 | 8/1967 | Dill. |

JOSEPH L. SCHOFER, *Primary Examiner.*

JOHN KIGHT, *Assistant Examiner.*

U.S. Cl. X.R.

151—7, 14.5, 41.7; 260—475

PO-1050
(5/69)

UNITED STATES PATENT OFFICE
CERTIFICATE OF CORRECTION

Patent No. 3,451,980      Dated June 24, 1969

Inventor(s) ARTHUR M. BROWNSTEIN

It is certified that error appears in the above-identified patent and that said Letters Patent are hereby corrected as shown below:

Column 3, line 32, after "carboxylic" insert --acid. This carboxylic acid moiety has a much broader definition and includes, in addition to the tetracarboxylic--; column 3, lines 33 and 34, cancel "broader definition and includes, in addition to the tetracarboxylic acids, supra, these same aromatic moieties"

SIGNED AND
SEALED
MAY 12 1970

(SEAL)
Attest:

Edward M. Fletcher, Jr.
Attesting Officer

WILLIAM E. SCHUYLER, JR.
Commissioner of Patents